United States Patent
Okuda

(10) Patent No.: US 9,740,014 B2
(45) Date of Patent: Aug. 22, 2017

(54) PROJECTION DISPLAY APPARATUS

(71) Applicant: Panasonic Intellectual Property Management Co., Ltd., Osaka (JP)

(72) Inventor: Michihiro Okuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/004,087

(22) Filed: Jan. 22, 2016

(65) Prior Publication Data

US 2016/0223893 A1    Aug. 4, 2016

(30) Foreign Application Priority Data

Jan. 30, 2015  (JP) ................... 2015-016836
Dec. 25, 2015  (JP) ................... 2015-253861

(51) Int. Cl.
*G03B 21/20* (2006.01)
*H04N 9/31* (2006.01)
(Continued)

(52) U.S. Cl.
CPC ......... *G02B 27/141* (2013.01); *G02B 26/008* (2013.01); *G03B 21/204* (2013.01); *G03B 21/2013* (2013.01); *G03B 21/2066* (2013.01); *G03B 33/06* (2013.01); *H04N 9/3105* (2013.01); *H04N 9/3158* (2013.01); *H04N 9/3161* (2013.01)

(58) Field of Classification Search
CPC .. G03B 21/2066; G03B 21/28; G03B 21/202; G03B 21/2026; G03B 21/206; G03B 21/204; H04N 9/315; H04N 9/3158; H04N 9/3161; H04N 9/3105; G02B 26/008; G02B 27/141
USPC ........................................... 353/55
See application file for complete search history.

(56) References Cited

U.S. PATENT DOCUMENTS 5,967,635 A   10/1999  Tani et al.
6,190,013 B1   2/2001  Tani et al.
(Continued)

FOREIGN PATENT DOCUMENTS

JP   11-038528 A   2/1999
JP   2000-275733 A   10/2000
(Continued)

*Primary Examiner* — Toan Ton
*Assistant Examiner* — Ryan Howard
(74) *Attorney, Agent, or Firm* — McDermott Will & Emery LLP

(57) ABSTRACT

A projection display apparatus includes: a laser light source which emits a blue light; a wheel which includes a light emitting body provided on a reflection surface of a substrate, the light emitting body emitting an emission light when the emitting body is irradiated with the blue light; a bandpass filter which is disposed on an optical path on which the emission light of the light emitting body travels; a plurality of optical modulating elements which modulate the blue light and the emission light from the light emitting body; and a projection unit which projects the light modulated by the plurality of optical modulating elements. The bandpass filter allows transmission of part of lights whose wavelength bands are 560 nm to 590 nm in the emission light of the light emitting body, and reflects other lights.

6 Claims, 10 Drawing Sheets

(51) Int. Cl.
　　　*G02B 27/14*　　　(2006.01)
　　　*G02B 26/00*　　　(2006.01)
　　　*G03B 33/06*　　　(2006.01)

(56)　　　　　References Cited

U.S. PATENT DOCUMENTS

| | | |
|---|---|---|
| 2011/0292349 A1 | 12/2011 | Kitano et al. |
| 2012/0268917 A1 | 10/2012 | Kitano et al. |
| 2014/0168614 A1 | 6/2014 | Matsubara et al. |
| 2014/0268063 A1* | 9/2014 | Akiyama ............. G03B 21/204 353/20 |

FOREIGN PATENT DOCUMENTS

| | | |
|---|---|---|
| JP | 2012-008549 A | 1/2012 |
| JP | 2012-234161 A | 11/2012 |
| JP | 2014-119471 A | 6/2014 |

* cited by examiner

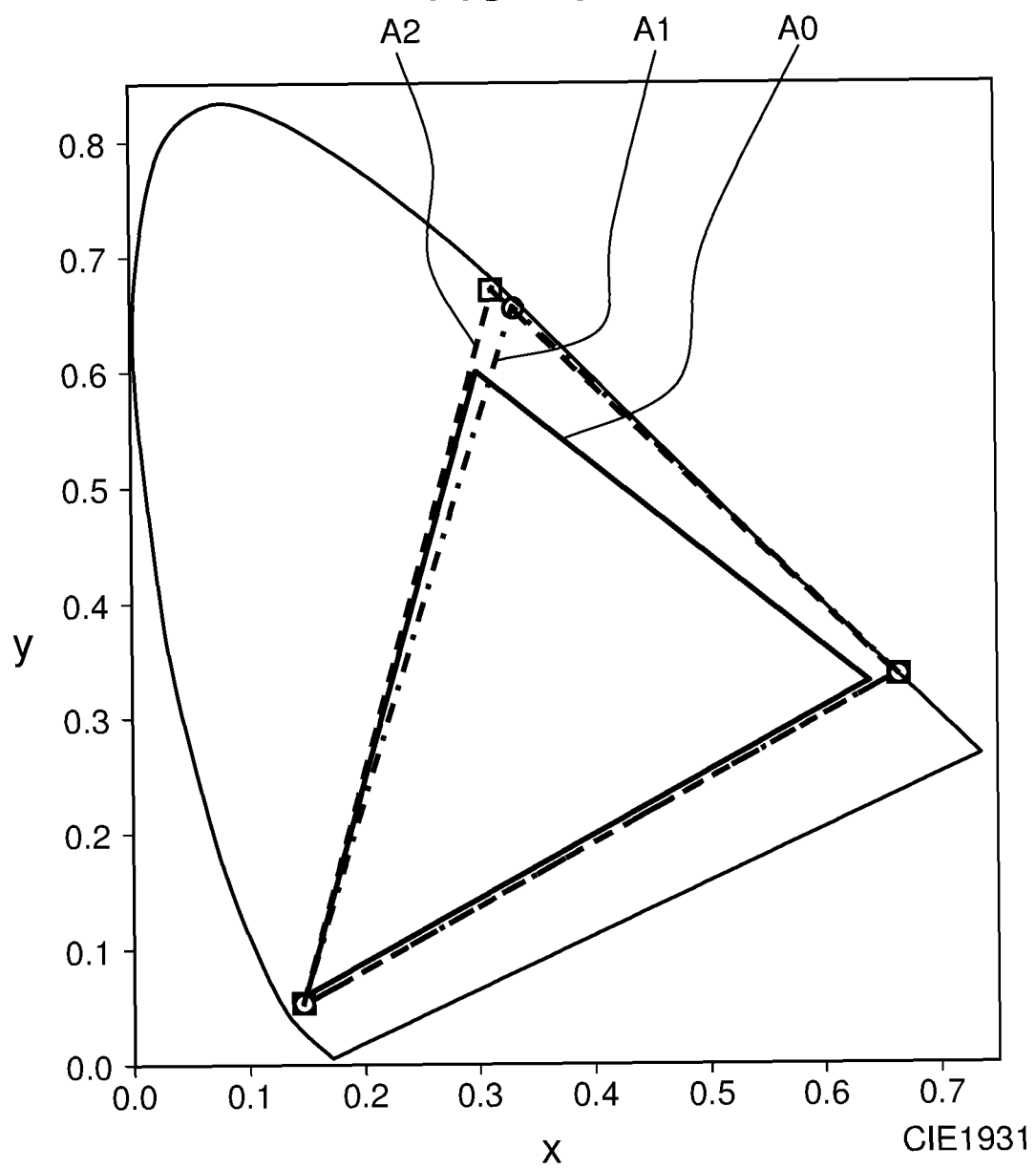

PROJECTION DISPLAY APPARATUS

RELATED APPLICATIONS

This application is based upon and claims the benefit of priority to Japanese Patent Application No. 2015-016836, filed on Jan. 30, 2015, and Japanese Patent Application No. 2015-253861, filed on Dec. 25, 2015, which are incorporated herein by reference in their entirety.

BACKGROUND

1. Technical Field

The present disclosure relates to a projection display apparatus which includes a light source apparatus which converts wavelengths of lights.

2. Description of the Related Art

PTL 1 discloses a projector which can form an image of high color reproducibility. A light source apparatus of this projector irradiates a phosphor with laser lights, so that the phosphor emits a yellow fluorescent light including a red light and a green light. A wavelength splitting element reduces an intensity of a light of a wavelength band which is part of fluorescent lights emitted from this phosphor to obtain a light source light. Thus, good color reproducibility is provided.

CITATION LIST

Patent Literature

PTL 1: Unexamined Japanese Patent Publication No. 2014-119471

SUMMARY

The present disclosure provides a projection display apparatus which improves a color purity of a green component light and adjusts a color reproduction range.

A projection display apparatus according to the present disclosure includes: a laser light source which emits a blue light; a wheel which includes a light emitting body provided on a reflection surface of a substrate, the light emitting body emitting an emission light when the emitting body is irradiated with the blue light; a bandpass filter which is disposed on an optical path on which the emission light of the light emitting body travels; a plurality of optical modulating elements which modulate the blue light and the emission light from the light emitting body; and a projection unit which projects the light modulated by the plurality of optical modulating elements. The bandpass filter allows transmission of part of lights whose wavelength bands are 560 nm to 590 nm in the emission light of the light emitting body, and reflects other lights.

The present disclosure can provide a projection display apparatus which improves a color purity of a green component light and adjusts a color reproduction range.

BRIEF DESCRIPTION OF DRAWINGS

FIG. 10 is a view illustrating a color reproduction range according to the first exemplary embodiment.

DETAILED DESCRIPTION OF THE PREFERRED EMBODIMENT

Exemplary embodiments will be described in detail below optionally with reference to the drawings. In this regard, the exemplary embodiments will not be described in detail more than necessary. For example, matters which have already been well known or substantially the same components will not be described again in some cases. This is to prevent the following description from unnecessarily becoming redundant, and help one of ordinary skill in the art understand the exemplary embodiments.

In addition, the accompanying drawings and the following description are provided to help one of ordinary skill in the art sufficiently understand the present disclosure, and do not intend to limit a subject matter recited in the claims.

[First Exemplary Embodiment]

(Projection Display Apparatus)

Figure 1:
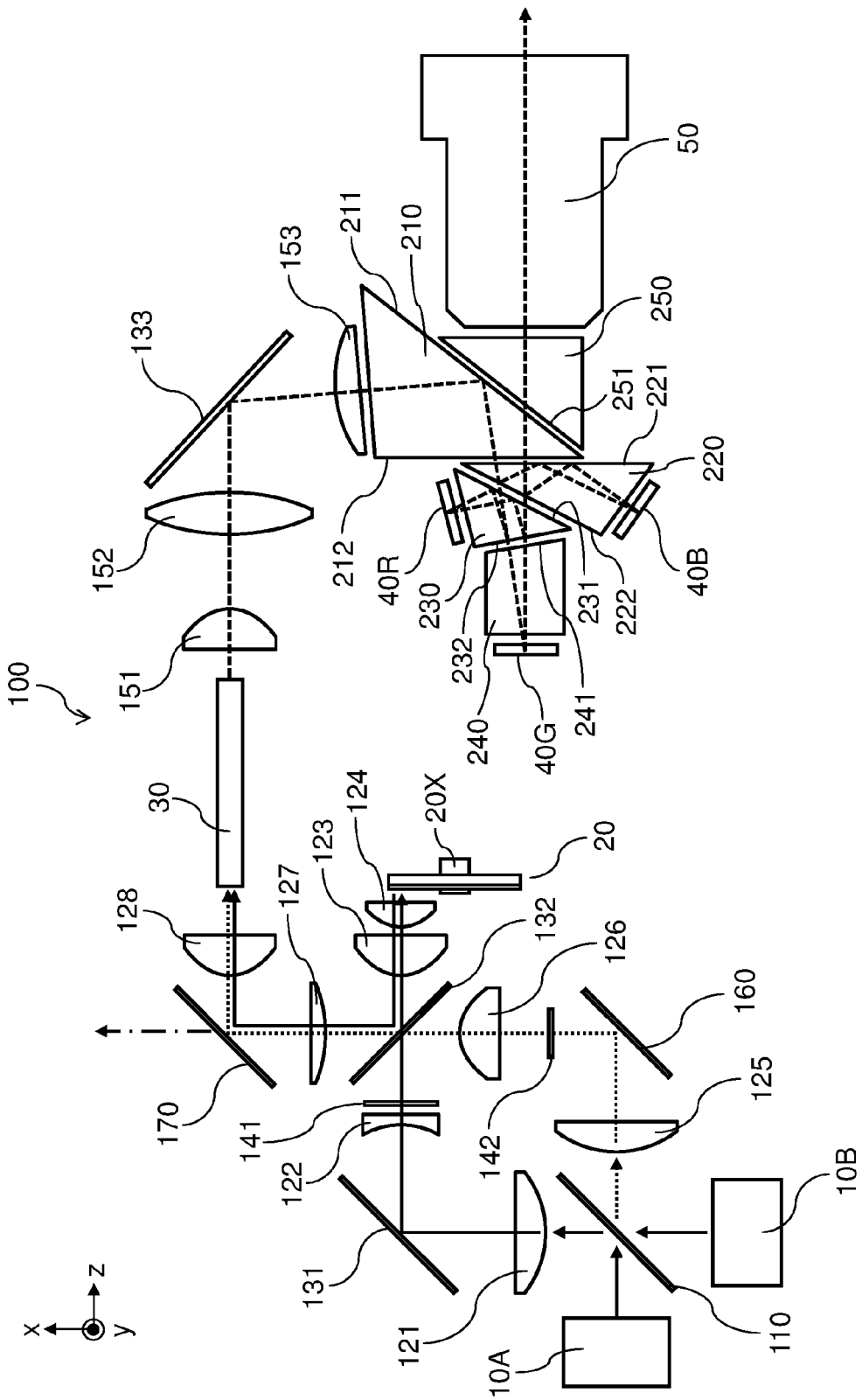
FIG. 1 is a view illustrating a projection display apparatus according to a first exemplary embodiment.

A configuration of a projection display apparatus according to the first exemplary embodiment will be described below with reference to FIGS. 1, 2A and 2B. FIG. 1 is a view illustrating projection display apparatus 100 according to the first exemplary embodiment.

As illustrated in FIG. 1, firstly, projection display apparatus 100 includes first light source unit 10A, second light source unit 10B, phosphor wheel 20, rod integrator 30, DMD (Digital Micromirror Device) including DMD 40R, DMD 40G and DMD 40B, and projection unit 50.

First light source unit 10A and second light source unit 10B include a plurality of solid state light sources such as laser diodes (LDs) and light emitting diodes (LED). In the present exemplary embodiment, for each solid state light source, a laser diode such as a laser diode which emits a blue light in particular is used. In this regard, each laser diode is a laser light source and an example of a light emitting element.

Emission lights from first light source unit 10A and second light source unit 10B are blue lights of wavelengths between 440 nm to 470 nm, and these blue lights are used as excitation lights for exciting a phosphor. In addition, first light source unit 10A and second light source unit 10B will be described in detail below (see FIGS. 4A and 4B).

Phosphor wheel 20 is configured to rotate about rotation shaft 20X elongated along an optical axis of an excitation light. Phosphor wheel 20 is a reflection phosphor wheel which emits an emission light in a direction opposite to an incident direction of an excitation light.

Figure 2B:
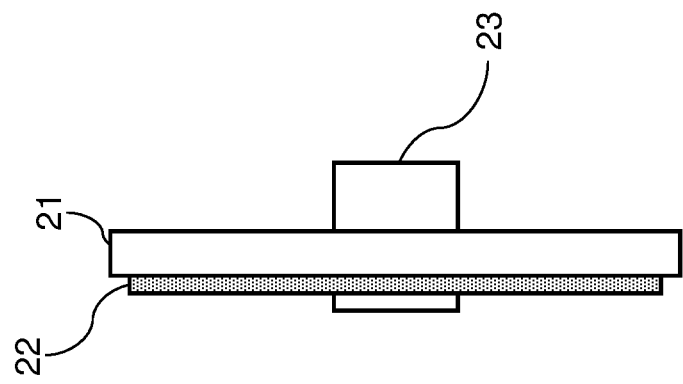
FIG. 2B is a side view of the phosphor wheel illustrated in FIG. 2A.
Figure 2A:
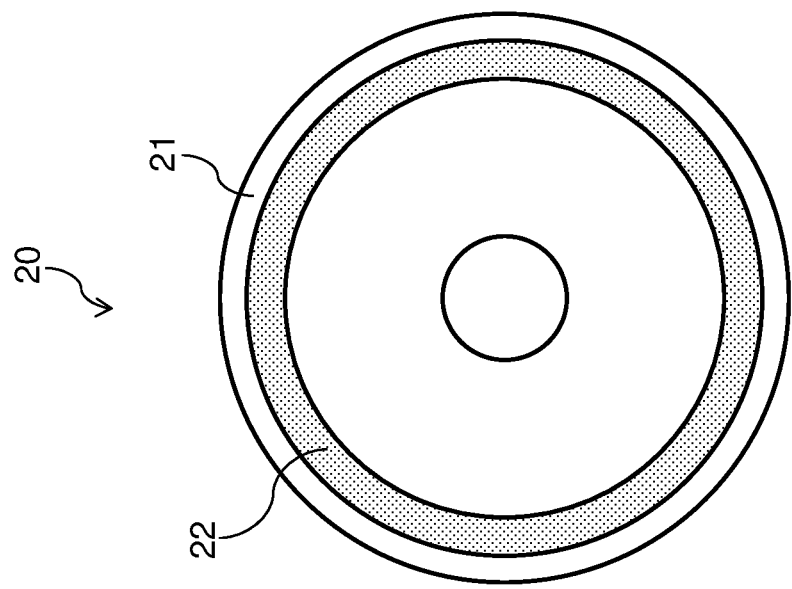
FIG. 2A is a plan view illustrating a phosphor wheel according to the first exemplary embodiment.

In more detail, as illustrated in FIGS. 2A and 2B, phosphor wheel 20 includes substrate 21, phosphor 22 which is annularly applied and formed on substrate 21 and in a rotation direction of substrate 21, and motor 23 which rotates substrate 21 on which phosphor 22 is formed. In addition, a reflection surface is formed by forming a reflection coating on a surface of substrate 21, and phosphor 22 is formed on this reflection surface. Phosphor 22 emits an emission light in response to excitation lights emitted from first light source unit 10A and second light source unit 10B. Lights emitted toward the reflection surface among yellow lights which are emission lights of phosphor 22 are reflected by the reflection surface. Phosphor 22 is an example of a light emitting body, and the phosphor wheel is an example of a wheel.

Phosphor 22 is a phosphor which emits fluorescent lights whose wavelength bands are mainly green to yellow. This phosphor 22 is preferably a phosphor which efficiently absorbs blue excitation lights, efficiently emits fluorescent lights and has robustness against temperature quenching. Phosphor 22 is, for example, Y3Al5O12: Ce3+ which is a cerium-activated garnet structure phosphor.

Rod integrator 30 is a solid rod made of a transparent material such as glass. Rod integrator 30 makes lights emitted from light source unit 10 uniform. In addition, rod integrator 30 may be a hollow rod whose inner wall is a mirror surface.

DMD 40 modulates lights emitted from first light source unit 10A, second light source unit 10B and phosphor wheel 20. In more detail, DMD 40 includes a plurality of micromirrors, and a plurality of micromirrors is movable. Each micromirror basically corresponds to one pixel. DMD 40 switches whether or not to reflect a light toward projection unit 50 by changing an angle of each micromirror.

In the first exemplary embodiment, as DMD 40, DMD 40R, DMD 40G and DMD 40B are provided. DMD 40R modulates red component light R based on red video signal R. DMD 40G modulates green component light G based on green video signal G. DMD 40B modulates blue component light B based on blue video signal B.

Projection unit 50 projects an image light modulated by DMD 40, on a projection surface.

Secondly, projection display apparatus 100 includes split/combining mirror 110. Split/combining mirror 110 is a mirror which combines emission lights from first light source unit 10A and second light source unit 10B, and splits part of emission lights. In addition, split/combining mirror 110 is an example of a split/combining optical element, and will not be described in detail below (see FIG. 5).

Further, projection display apparatus 100 includes a necessary mirror group. As the mirror group, mirror 131 to mirror 133 and mirror 160 are provided. Mirror 131, mirror 133 and mirror 160 are mirrors which bend optical paths. Dichroic mirror 132 is a dichroic mirror which has characteristics for allowing transmission of blue lights and reflecting yellow lights, and is an example of a combining optical element.

Further, projection display apparatus 100 includes bandpass filter 170. Bandpass filter 170 is a bandpass filter which allows transmission of part of wavelength bands of yellow lights reflected by dichroic mirror 132, and reflects a rest of wavelengths bands. Unnecessary lights (dashed-dotted line in FIG. 1) which have transmitted through bandpass filter 170 are ejected to an outside of an optical path, and there is no optical path in a traveling direction of the unnecessary lights. Further, the unnecessary lights are desirably shielded by a shielding object to prevent the unnecessary lights from becoming stray lights and influencing a projected image. The shielding object is, for example, an absorber which absorbs visible lights and a wall surface of a retaining case of optical units which cover an optical system. In addition, bandpass filter 170 will be described in detail below.

Further, projection display apparatus 100 includes a necessary lens group. As the lens group, lens 121 to lens 128 and lens 151 to lens 153 are provided. Lens 121 is a condenser lens which condenses emission lights from first light source unit 10A and second light source unit 10B. Lens 122 is a convex lens which converts lights condensed by lens 121 into parallel lights. Lens 123 and lens 124 are condenser lenses which condense excitation lights on the phosphor of the phosphor wheel, and convert lights emitted from the phosphor, into parallel lights. Lens 125 is a condenser lens which condenses emission lights from first light source unit 10A and second light source unit 10B. Lens 126 is a condenser lens which is disposed at a downstream of a light condensing point of lights by lens 125, and converts the condensed lights into parallel lights again. Lens 127 and lens 128 are relay lenses which guide, to rod integrator 30, emission lights from first light source unit 10A and second light source unit 10B, and an emission light from the phosphor wheel. Lens 151, lens 152 and lens 153 are relay lenses which nearly form emission lights from rod integrator 30, on each DMD 40.

Further, projection display apparatus 100 includes a necessary diffuser group. As the diffuser group, diffuser 141 and diffuser 142 are provided. Diffuser 141 is a diffuser which diffuses lights incident as nearly parallel lights. Diffuser 142 is a diffuser which is disposed near a light condensing point of light fluxes of lens 125 and diffuses the light fluxes. Diffuser 141 and diffuser 142 are configured such that, for example, micro irregularities are formed on a surface of a glass substrate. Further, the micro irregular surface may be formed on a single surface or double surfaces.

In addition, a shape of each lens is adjusted such that light emission points of emission lights from phosphor wheel 20 and an incident surface of rod integrator 30 are nearly conjugate and diffuser 142 and the incident surface of rod integrator 30 are nearly conjugate.

Thirdly, projection display apparatus 100 includes a necessary prism group. As the prism group, prism 210, prism 220, prism 230, prism 240 and prism 250 are provided.

Prism 210 is made of a transparent material, and includes surface 211 and surface 212. An air gap is provided between prism 210 (surface 211) and prism 250 (surface 251). An angle (incident angle) at which a light incident on prism 210 is incident on surface 211 is larger than a total reflection angle, and therefore the light incident on prism 210 is reflected by surface 211. Meanwhile, an air gap is provided between prism 210 (surface 212) and prism 220 (surface 221). However, an angle (incident angle) at which the light reflected by surface 211 is incident on surface 212 is smaller than the total reflection angle, and therefore the light reflected by surface 211 transmits through surface 212.

Prism 220 is made of a transparent material, and includes surface 221 and surface 222. Surface 222 is a dichroic mirror surface which allows red component light R and green component light G to transmit, and reflects blue component light B. Hence, red component light R and green component light G among lights reflected by surface 211 transmit through surface 222, and blue component light B is reflected by surface 222. Blue component light B reflected by surface 222 is reflected by surface 221, and is incident on DMD 40B. In addition, red component light R emitted from DMD 40R and green component light G emitted from DMD 40G transmit through surface 222 and surface 221.

An air gap is provided between prism 210 (surface 212) and prism 220 (surface 221). Angles (incident angles) at which blue component light B first emitted from surface 222 and blue component light B emitted from DMD 40B are incident on surface 221 are larger than the total reflection angle, and therefore blue component light B first reflected by surface 222 and blue component light B emitted from DMD 40B are reflected by surface 221. Meanwhile, an angle (incident angle) at which blue component light B reflected by surface 221 and then reflected at a second time by surface 222 is incident on surface 221 is smaller than the total reflection angle, and therefore blue component light B reflected by surface 221 and then reflected at the second time by surface 222 transmits through surface 221.

Prism 230 is made of a transparent material, and includes surface 231 and surface 232. Surface 232 is a dichroic mirror surface which allows green component light G to transmit, and reflects red component light R. Hence, green component light G among lights reflected by surface 231 transmit through surface 232, and red component light R is reflected by surface 232. Red component light R reflected by surface 232 is reflected by surface 231, and is incident on DMD 40R. In addition, green component light G emitted from DMD 40G transmits through surface 232 and surface 231.

An air gap is provided between prism 220 (surface 222) and prism 230 (surface 231). Angles (incident angles) at which red component light R transmitting through surface 231 and reflected by surface 232 and red component light R emitted from DMD 40R is incident on surface 231 are incident on surface 221 again are larger than the total reflection angle, and therefore red component light R transmitting through surface 231 and reflected by surface 232 and red component light R emitted from DMD 40R are reflected by surface 231. Meanwhile, an angle (incident angle) at which red component light R emitted from DMD 40R, reflected by surface 231 and then reflected by surface 232 is incident on surface 231 is smaller than the total reflection angle, and therefore red component light R emitted from DMD 40R, reflected by surface 231 and then reflected by surface 232 transmits through surface 231.

Prism 240 is made of a transparent material, and includes surface 241. Surface 241 is configured to allow green component light G to transmit. In addition, green component light G incident on DMD 40G and green component light G emitted from DMD 40G transmit through surface 241.

Prism 250 is made of a transparent material, and includes surface 251.

In other words, blue component light B (1) is reflected by surface 211, (2) transmits through surface 212 and surface 221, then is reflected by surface 222, (3) is reflected by surface 221, (4) is reflected by DMD 40B, (5) is reflected by surface 221, (6) is reflected by surface 222 and (7) transmits through surface 221, surface 212, surface 211 and surface 251. Thus, blue component light B is modulated by DMD 40B and is guided by projection unit 50.

Red component light R (1) is reflected by surface 211, (2) transmits through surface 212, surface 221, surface 222 and surface 231, then is reflected by surface 232, (3) is reflected by surface 231, (4) is reflected by DMD 40R, (5) is reflected by surface 231, (6) is reflected by surface 232 and (7) transmits through surface 231, surface 232, surface 221, surface 212, surface 211 and surface 251. Thus, red component light R is modulated by DMD 40R and is guided to projection unit 50.

Green component light G (1) is reflected by surface 211, (2) transmits through surface 212, surface 221, surface 222, surface 231, surface 232 and surface 241, then is reflected by DMD 40G, and (3) transmits through surface 241, surface 232, surface 231, surface 222, surface 221, surface 212, surface 211 and surface 251. Thus, green component light G is modulated by DMD 40G and is guided to projection unit 50.

(Light Source Apparatus)

Figure 3:
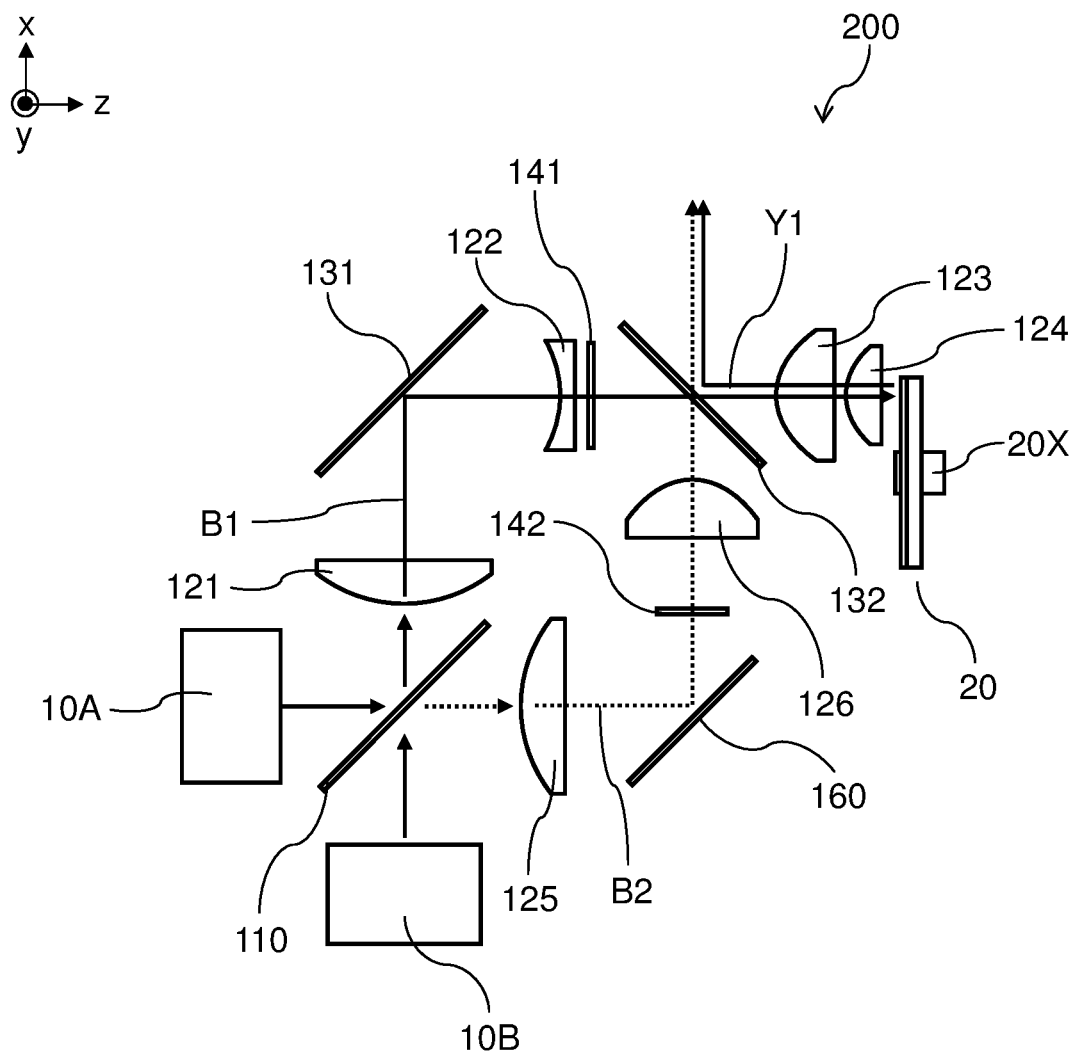
FIG. 3 is a view illustrating a light source apparatus according to the first exemplary embodiment.

The light source apparatus according to the first exemplary embodiment will be described below with reference to FIGS. 3 to 6. FIG. 3 is a view illustrating light source apparatus 200 according to the first exemplary embodiment.

Light source apparatus 200 used in projection display apparatus 100 illustrated in FIG. 1 mainly includes first light source unit 10A, second light source unit 10B, split/combining mirror 110 and phosphor wheel 20. Further, light source apparatus 200 includes the necessary lens group and mirror group. These components and description of the components are the same as contents described with reference to projection display apparatus 100, and therefore will not be described again.

Figure 4A:
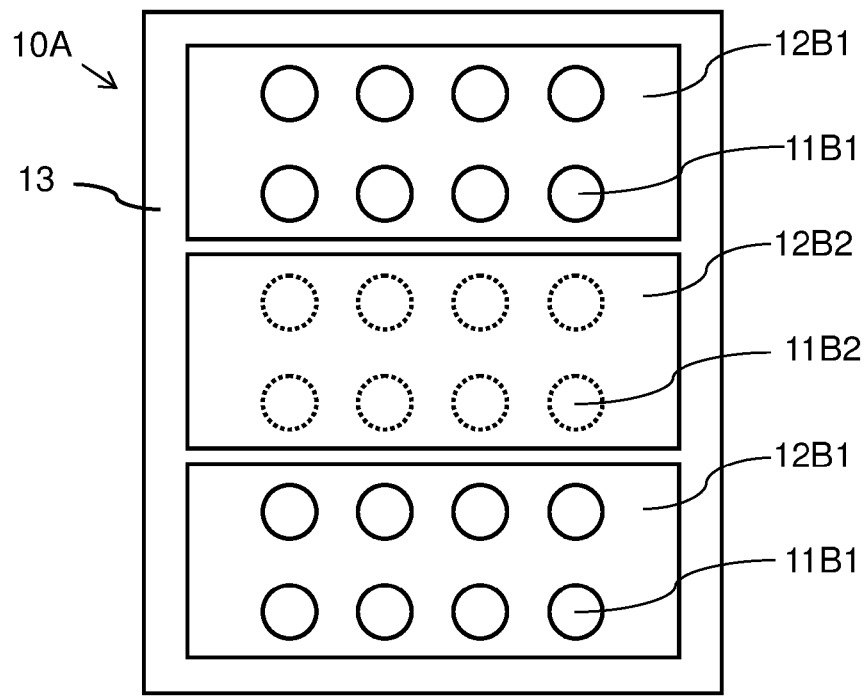
FIG. 4A is a view illustrating a first light source unit according to the first exemplary embodiment.
Figure 4B:
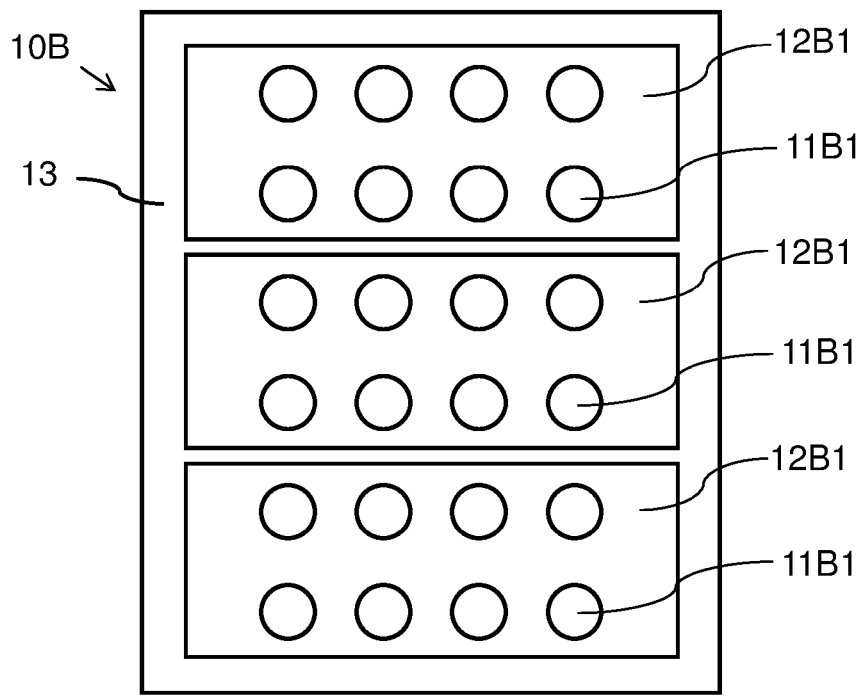
FIG. 4B is a view illustrating a second light source unit according to the first exemplary embodiment.

FIG. 4A is a view illustrating first light source unit 10A from a ⁻z direction in FIG. 1. FIG. 4B is a view illustrating second light source unit 10B from a ⁻x direction in FIG. 1.

First light source unit 10A includes light source blocks 12B1 and 12B2 which respectively include pluralities of laser diodes 11B1 and 11B2 which emit blue lights, and heat sink 13. Second light source unit 10B includes light source block 12B1 which includes a plurality of laser diodes 11B1 which emits blue lights, and heat sink 13. Laser diodes 11B1 and 11B2 will be collectively referred to as laser diode 11, and light source blocks 12B1 and 12B2 will be collectively referred to as light source block 12.

First light source unit 10A includes three light source blocks 12, and light source blocks 12B1 are disposed at an upper portion and a lower portion and light source block 12B2 is disposed at a center portion. Meanwhile, second light source unit 10B includes three same light source blocks 12B1.

Light source blocks 12B1 at the upper portion and the lower portion of first light source unit 10A, three light source blocks 12B1 of second light source unit 10B and light source block 12B2 at the center portion of first light source unit 10A will be assigned different reference numerals for ease of description. Further, laser diodes 11B2 are indicated by broken lines, and laser diodes 11B1 and laser diodes 11B2 which are assigned different reference numerals in the first exemplary embodiment for ease of description but have the same characteristics (wavelengths are 455 nm).

Light source block 12B1 employs a configuration where eight laser diodes 11B1 in total including four in a horizontal direction and two in a vertical direction are arranged. Light source block 12B2 employs a configuration where eight laser diodes 11B2 in total including four in the horizontal direction and two in the vertical direction are arranged.

Laser diode 11 is integrated with a collimate lens which converts an emission light into a parallel light, and laser diode 11 emits a nearly parallel light.

Heat sink 13 is made to adhere to a back surface of a light source block via, for example, a thermally conductive grease.

Figure 5:
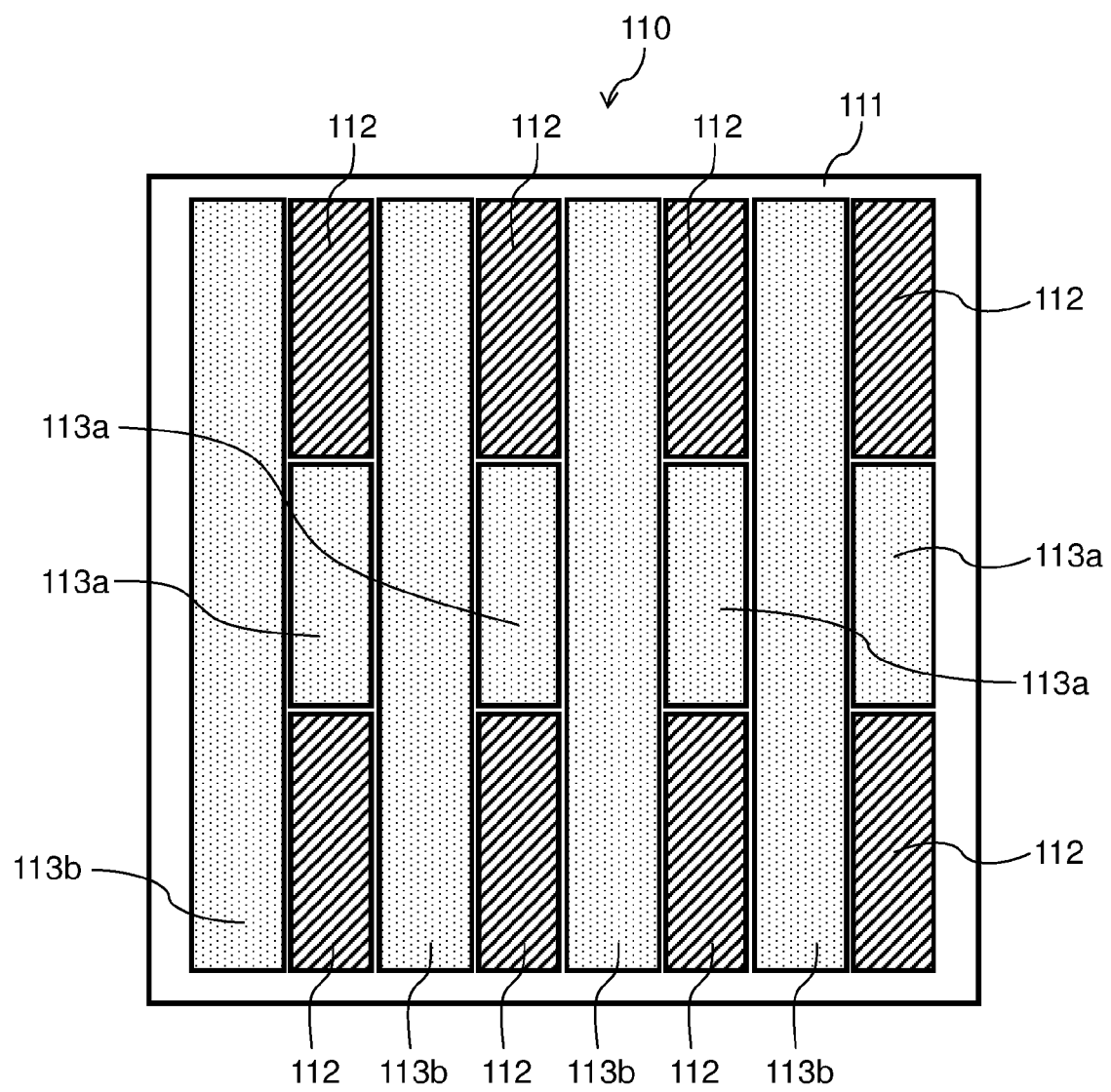
FIG. 5 is a view illustrating a split/combining mirror according to the first exemplary embodiment.

As illustrated in FIG. 5, split/combining mirror 110 is configured such that reflection areas 112 (hatching portions) and transmissive areas 113a and 113b (shaded portions) are formed on substrate 111. Substrate 111 is, for example, a glass substrate. On each reflection area 112, a reflection coating which reflects emission lights from first light source unit 10A and second light source unit 10B is formed. On transmissive areas 113a and 113b, AR (Anti-Reflection) coating which allow emission lights from first light source unit 10A and second light source unit 10B to transmit are formed. In addition, it is desirable to form an AR (Anti-Reflection) coating likewise on a back surface of substrate 111, too.

In this regard, a splitting and combining operation of split/combining mirror 110 will be described with reference to FIG. 6.

Figure 6:
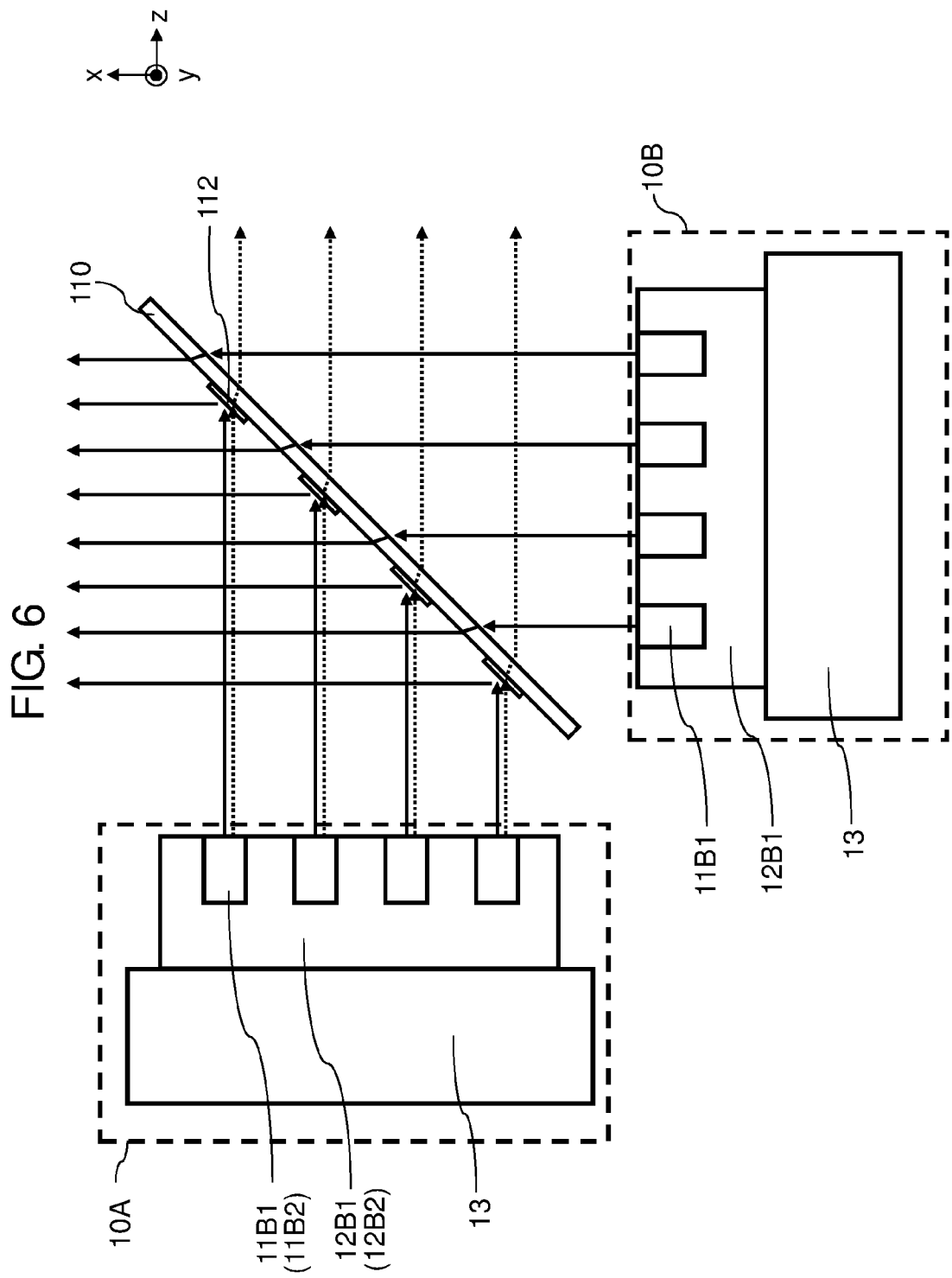
FIG. 6 is a view illustrating split and combining of light fluxes according to the first exemplary embodiment.

As illustrated in FIG. 6, first light source unit 10A emits blue lights in the z direction (first direction), and second light source unit 10B emits blue lights in the x direction (second direction). Thus, first light source unit 10A and second light source unit 10B are disposed such that respective emission directions, i.e., the first direction intersects with the second direction at 90°. Split/combining mirror 110 is disposed so as to incline toward the emission direction of the blue lights from first light source unit 10A and second light source unit 10B in this intersection area.

Emission lights from laser diodes 11B1 included in light source block 12B1 among the emission lights from first light source unit 10A are reflected at reflection areas 112 of split/combining mirror 110.

Meanwhile, emission lights (indicated by broken line arrows) from laser diodes 11B2 included in light source block 12B2 among the emission lights from first light source unit 10A transmit through transmissive areas 113a of split/combining mirror 110 (not illustrated in FIG. 6).

All emission lights from second light source unit 10B are emission lights from laser diodes 11B1 included in light source block 12B1 and transmit through transmissive areas 113b of split/combining mirror 110.

Thus, as illustrated in FIG. 6, light fluxes reflected by split/combining mirror 110 among emission lights from first light source unit 10A, and light fluxes whose emission lights are emitted from second light source unit 10B transmit through split/combining mirror 110 are alternately disposed. The alternate disposition is possible since, on split/combining mirror 110, reflection areas and transmissive areas are selectively formed to meet positions of a plurality of emission light fluxes from first light source unit 10A and second light source unit 10B.

Back to FIG. 3, the light fluxes of the emission lights from first light source unit 10A and second light source unit 10B are split into excitation light B1 for exciting phosphor wheel 20 and blue light B2 used as an image light and are combined by split/combining mirror 110.

A blue light obtained by combining the blue light reflected and split by split/combining mirror 110 and emitted from first light source unit 10A and the blue light from second light source unit 10B becomes excitation light B1. This excitation light B1 passes through an optical path (first optical path) including a route of lens 121, mirror 131, lens 122, diffuser 141, dichroic mirror 132, lens 123, lens 124 and phosphor wheel 20. Thus, excitation light B1 is applied to phosphor 22 of phosphor wheel 20 to emit yellow light Y1.

Meanwhile, part of blue lights from first light source unit 10A transmit through split/combining mirror 110, and become blue lights B2. This blue light B2 passes through an optical path (second optical path) including a route of lens 125, mirror 160, diffuser 142, dichroic mirror 126 and dichroic mirror 132. Further, yellow light Y1 and blue light B2 are combined by dichroic mirror 132 (i.e., the first optical path and the second optical path are combined into one optical path), and are emitted as a while light.

(Color Design of Projection Display Apparatus)

Figure 7:
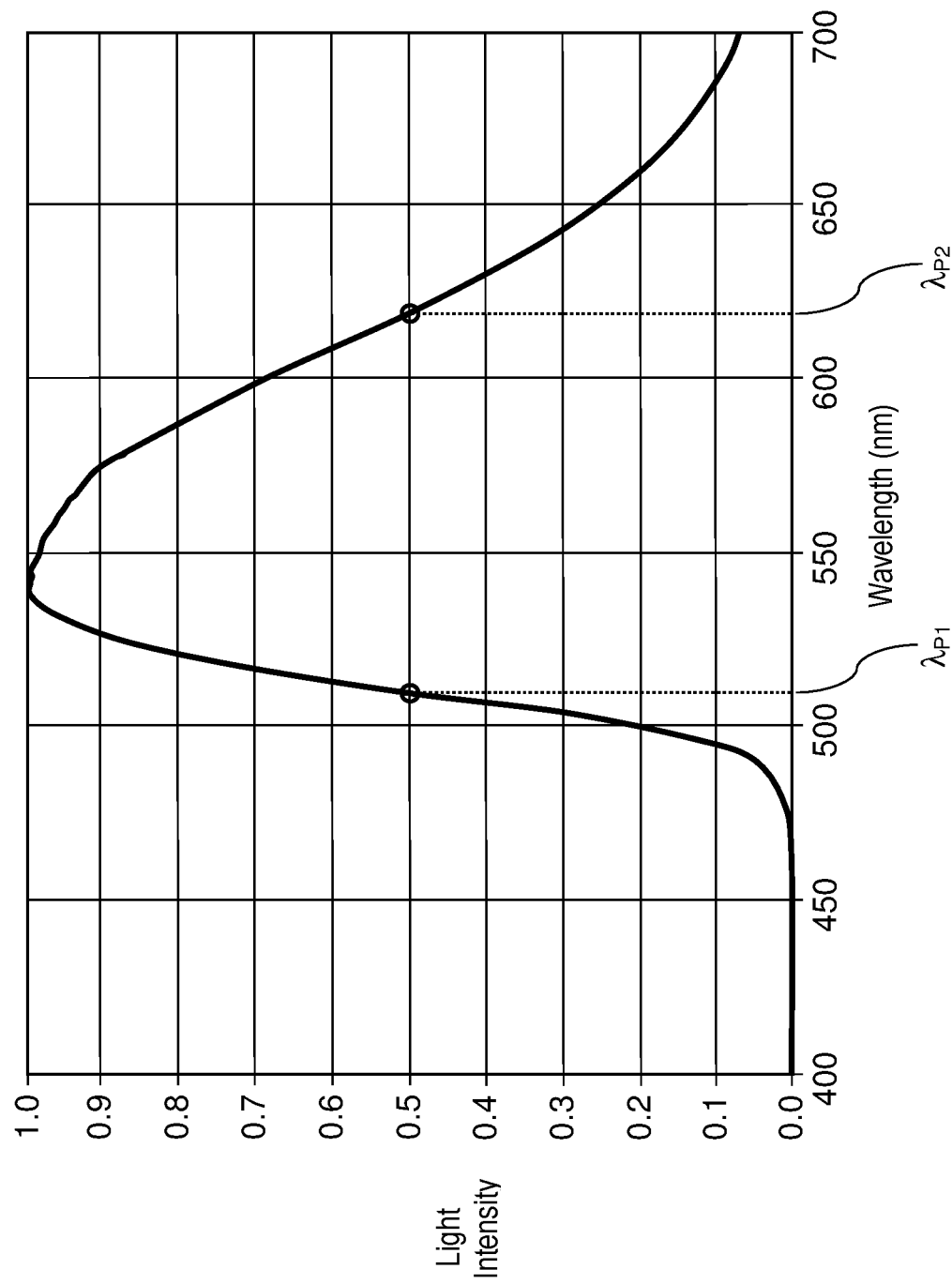
FIG. 7 is a plan view illustrating an emission spectrum of a phosphor wheel according to the first exemplary embodiment.

The color design of the projection display apparatus according to the first exemplary embodiment will be described below with reference to FIGS. 7 and 10. FIG. 7 is a view illustrating an emission spectrum of phosphor wheel 20. In the emission spectrum of phosphor wheel 20, the light intensity indicates the maximum (peak) value at wavelength of 540 nm and 50% of the peak light intensity at wavelength of 510 nm and 620 nm. Half-maximum wavelength $\lambda_{P1}$ of a short wavelength side is 510 nm and half-maximum wavelength $\lambda_{P2}$ of a long wavelength side is 620 nm. The spectrum width FWHM (Full Width at Half Maximum) is 110 nm.

A phosphor material indicating such an emission spectrum is, for example, Y3Al5O12: Ce3+ which is a cerium-activated garnet structure phosphor. In this regard, in the present embodiment, an emission spectrum shape described herein changes depending on various factors such as a temperature of phosphor 22 and spectral characteristics of substrate 21, and therefore is an exemplary emission spectrum shape.

Figure 8:
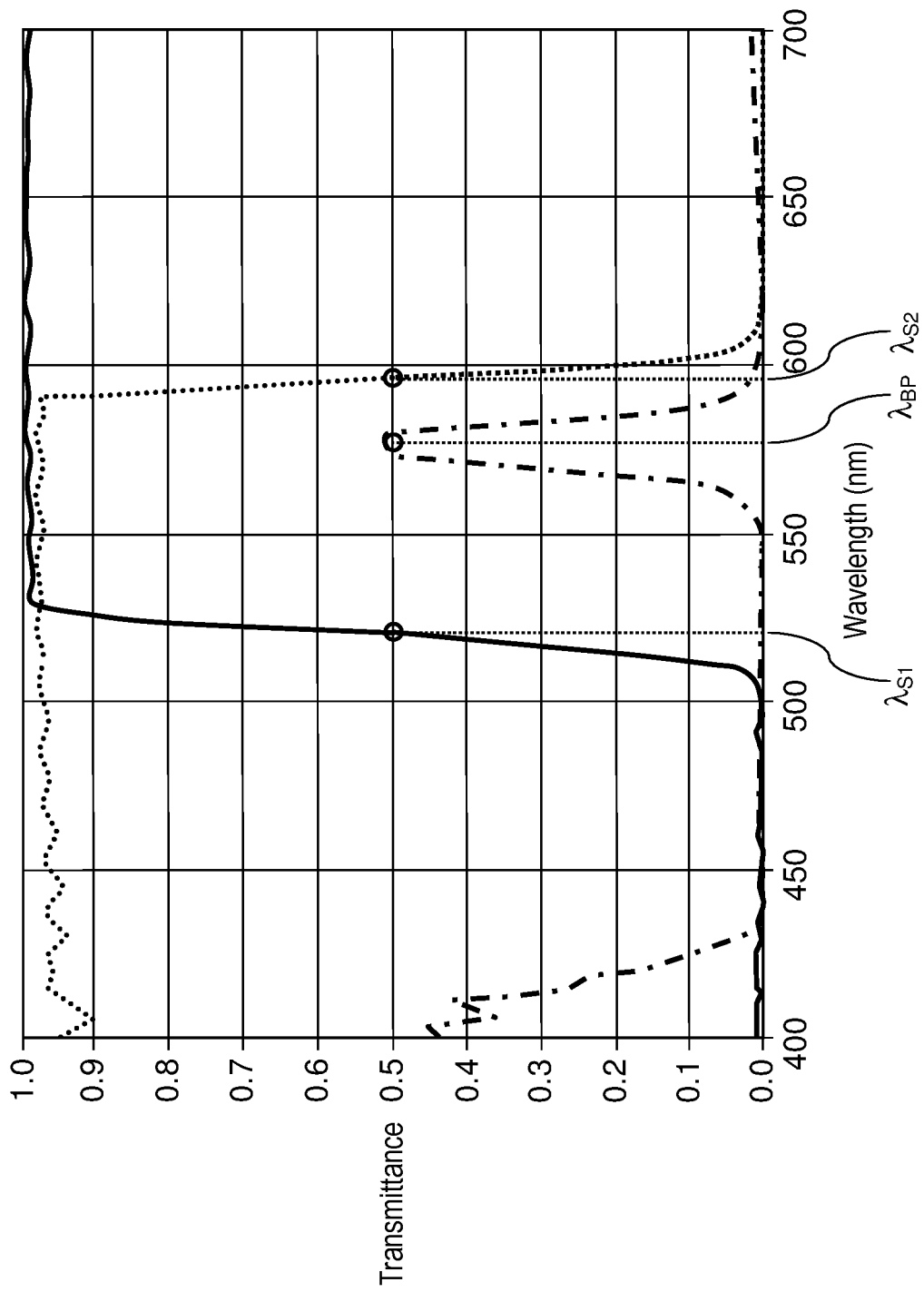
FIG. 8 is a view illustrating spectral transmittances of a prism surface and a bandpass filter according to the first exemplary embodiment.

Next, surface 222 of prism 220 and surface 232 of prism 230, and a spectral transmittance of bandpass filter 170 will be described. Prism 220 and prism 230 are examples of split optical unit. As illustrated in FIG. 8, surface 222 has characteristics for reflecting of lights in a blue wavelength band, and allowing transmission of lights in green to red wavelength bands (solid line in FIG. 8). Cutoff wavelength $\lambda_{S1}$ of spectral characteristics of surface 222 is 520 nm. The cutoff wavelength is the wavelength at which transmittance is 50%. Surface 232 has characteristics for allowing transmission of the blue to green wavelength bands and reflecting lights in the red wavelength band (dotted line in FIG. 8). Cutoff wavelength $\lambda_{S2}$ of spectral characteristics of surface 232 is 596 nm. In addition, the spectral transmittance described herein refers to characteristics obtained when an optical axis of an optical path from DMD 40 to a screen via projection unit 50 is a reference incident angle.

When the optical axis of the optical path to DMD 40 is the reference incident angle, attention needs to be paid to that the cutoff wavelength is shifted to a short wavelength side. When such a shift of the cutoff wavelength is strictly taken into account, cutoff wavelength $\lambda_{S1}$ of spectral characteristics of surface 222 is shifted to 511 nm, and cutoff wavelength $\lambda_{S2}$ of spectral characteristics of surface 232 is shifted to 580 nm.

Roughly speaking, lights whose wavelengths are 520 nm or shorter are modulated by DMD 40B and become blue image lights. Short wavelength side half-maximum wavelength $\lambda_{P1}$ of the emission spectrum of phosphor wheel 20 is 510 nm, and therefore emission lights from phosphor wheel 20 include component lights whose lights are 520 nm or shorter. Hence, blue image lights include laser lights (455 nm) and lights in the blue wavelength band at a short wavelength side of the emission lights from phosphor wheel 20. Lights whose wavelengths are 520 nm to 596 nm are modulated by DMD 40G, and become green image lights beam. That is, the green image lights include lights in the green wavelength band of the emission lights from phosphor wheel 20. Lights whose wavelengths are 596 nm or longer are modulated by DMD 40R, and become red image lights. That is, the red component lights include lights in the red wavelength band at the long wavelength side of the emission lights from phosphor wheel 20.

Meanwhile, bandpass filter 170 has characteristics for allowing transmission of only part of lights in a wavelength band whose wavelengths are 560 nm to 590 nm, and reflecting lights of other wavelengths bands (see a dashed dotted line in FIG. 8). Wavelength $\lambda_{BP}$ in which a transmittance is maximized is 576 nm, and the transmittance in this case is 50%. Hence, a wavelength band cut off by bandpass filter 170 is included in the green component light modulated by DMD 40G, and is a long wavelength band. Further, bandpass filter 170 simply functions as a reflection mirror for red component lights and blue component lights.

Figure 9:
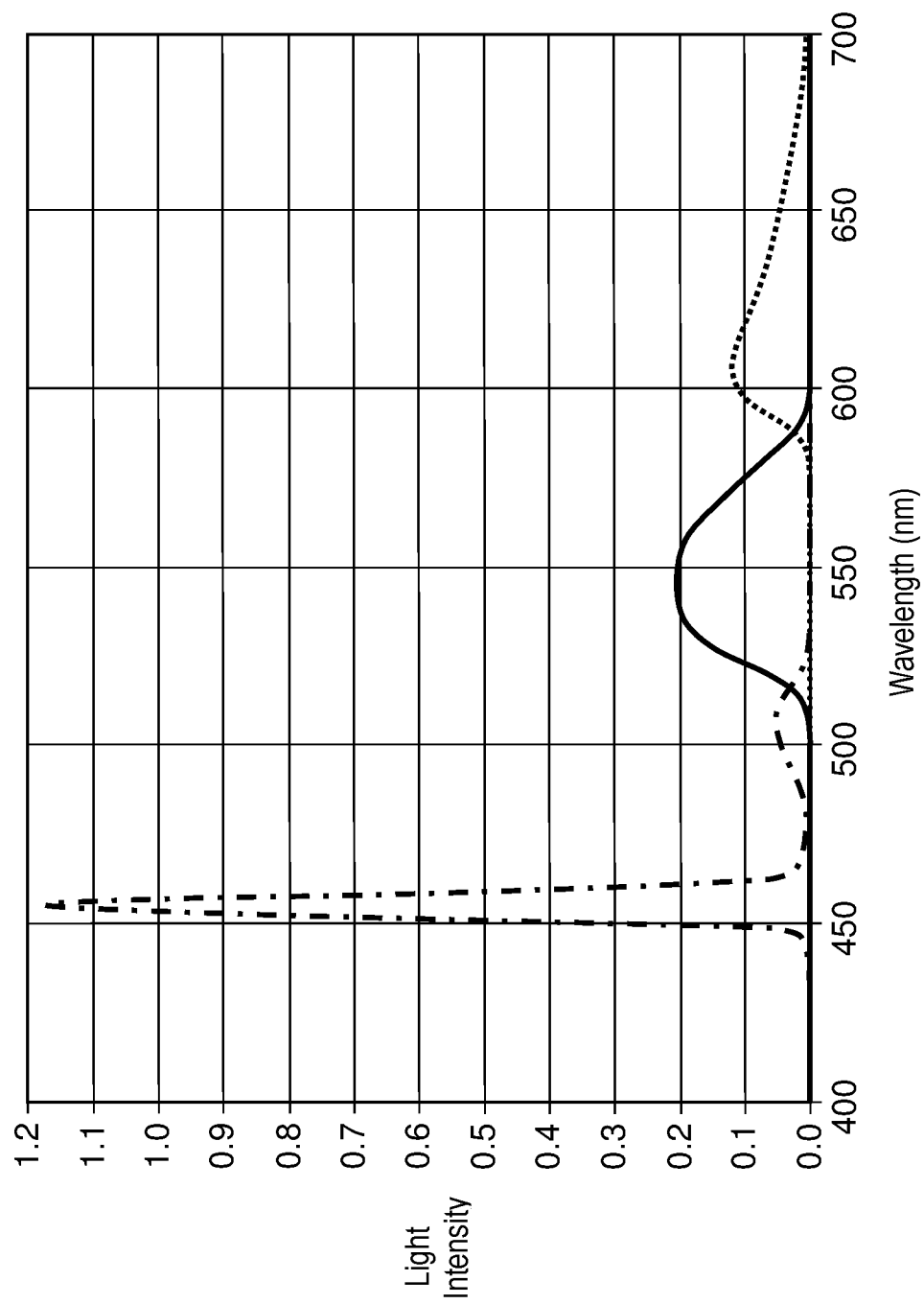
FIG. 9 is a view illustrating a spectrum of each color image light of a projection display apparatus according to the first exemplary embodiment.

FIG. 9 is a view illustrating a spectrum of each color image light of projection display apparatus 100. A blue image light (dashed-dotted line) includes a combined light of laser lights (455 nm) and a light in the blue wavelength band at the short wavelength side of the emission light from phosphor wheel 20. A dominant wavelength of the combined wavelength light of the blue image light is 465 nm. To realize an appropriate chromaticity of the blue image light, the dominant wavelength of the combined light needs to fall within a range from 460 nm to 470 nm. In addition, a wavelength of a laser light is 455 nm in the present exemplary embodiment. However, as long as the dominant wavelength of the blue image light which is the combined light falls within a range from 460 nm to 470 nm, the dominant wavelength may be 455 nm or shorter or may be 460 nm or shorter. The green image light (solid line) includes a light in the green wavelength band of the emission light from phosphor wheel 20. The red image light (dotted line) includes a light in the red wavelength band at the long wavelength side of the emission light from phosphor wheel 20.

FIG. 10 is a view illustrating a color reproduction range of projection display apparatus 100 according to the first exemplary embodiment.

Color reproduction range A0 complies with sRGB standards. Color reproduction range A1 is a color reproduction range in a case where bandpass filter 170 is not used (a normal reflection mirror is used). Color reproduction range A2 is a color reproduction range in case where bandpass filter 170 is used. Color reproduction range A2 includes color reproduction range A0.

(Function and Effect)

According to the first exemplary embodiment, by disposing on the optical path of projection display apparatus 100 bandpass filter 170 which allows transmission of only part of lights in the yellow wavelength band and reflects lights of other wavelength bands, it is possible to improve color purity of green component lights and adjust the color reproduction range.

According to the first exemplary embodiment, each blue component light includes a laser light whose wavelength is 455 nm and a light in the blue wavelength band at the short wavelength side of the emission lights from phosphor wheel 20. Consequently, it is possible to improve color purity of a blue component light, and adjust the color reproduction range.

[Other Exemplary Embodiments]

The above exemplary embodiments have been described above as exemplary techniques disclosed in this application. However, the techniques according to the present disclosure are not limited to these, and are applicable to exemplary embodiments, too, which are changed, replaced, added or omitted. Further, it is also possible to provide new exemplary embodiments by combining components described in the above exemplary embodiments. Hereinafter, other exemplary embodiments will be described below.

Three DMDs 40R, 40G and 40B have been described as optical modulating elements in the above exemplary embodiments. However, the exemplary embodiments are not limited to this. The optical modulating element may be one DMD. Alternatively, the optical modulating element may be one liquid crystal panel or three liquid crystal panels (a red liquid crystal panel, a green liquid crystal panel and a blue liquid crystal panel). Each liquid crystal panel may be a transmissive liquid crystal panel or a reflection liquid crystal panel.

According to the first exemplary embodiment, bandpass filter 170 is disposed on the optical path of emission lights from light source apparatus 200. However, a disposition position is not limited to this. Other fold mirrors on the optical path can be replaced with the bandpass filter. In projection display apparatus 100 according to the first exemplary embodiment (see FIG. 1), bandpass filter 170 may also be used instead of, for example, mirror 133.

In addition, the above exemplary embodiments are exemplary embodiments of the technique according to the present disclosure, and therefore can be variously changed, replaced, added and omitted in a range of the claims or a range equivalent to the claims.

The present disclosure is applicable to a projection display apparatus such as a projector.

What is claimed is:

1. A projection display apparatus comprising:
    a laser light source which emits a blue light;
    a wheel which includes a light emitting body provided on a reflection surface of a substrate, the light emitting body emitting an emission light when the emitting body is irradiated with the blue light;
    a bandpass filter which is disposed on an optical path on which the emission light of the light emitting body travels;
    a plurality of optical modulating elements which modulate the blue light and the emission light from the light emitting body;
    a projection unit which projects the light modulated by the plurality of optical modulating elements; and
    a combining optical element which combines the emission light and the blue light to emit a combined light,
    wherein the bandpass filter allows transmission of part of lights whose wavelength bands are 560 nm to 590 nm in the emission light of the light emitting body, and reflects other lights and is disposed on the optical path on which an emission light from the combining optical element travels.

2. The projection display apparatus according to claim 1, further comprising a split optical unit including two dichroic mirrors which split the blue light and the emission light from the light emitting body into a red image light, a green image light and a blue image light.

3. The projection display apparatus according to claim 2, wherein a wavelength in which a transmittance in a transmission wavelength band of the bandpass filter is maximized is shorter than a cutoff wavelength at which transmittance is 50% of a dichroic mirror surface, which splits the red image light and the green image light, of the split optical unit.

4. The projection display apparatus according to claim 3, wherein a dominant wavelength of the blue image light falls within a range from 460 nm to 470 nm.

5. The projection display apparatus according to claim 4, wherein a half-maximum wavelength of short wavelength side in an emission spectrum of the light emitting body is shorter than a cutoff wavelength at which transmittance is 50% of a dichroic mirror surface, which splits the green light and the blue light, of the split optical unit.

6. The projection display apparatus according to claim 5, wherein a dominant wavelength of the laser light source is 460 nm or shorter.

\* \* \* \* \*